United States Patent [19]

Brown et al.

[11] 4,225,390
[45] Sep. 30, 1980

[54] BORON CONTROL SYSTEM FOR A NUCLEAR POWER PLANT

[75] Inventors: William W. Brown, Monroeville; Martinus R. Van der Schoot, Pittsburgh, both of Pa.

[73] Assignee: Westinghouse Electric Corp., Pittsburgh, Pa.

[21] Appl. No.: 290,053

[22] Filed: Sep. 18, 1972

Related U.S. Application Data

[63] Continuation of Ser. No. 2,797, Jan. 14, 1970, abandoned.

[51] Int. Cl.$^2$ .............................................. G21C 7/00
[52] U.S. Cl. ...................................... 176/86 L; 176/37
[58] Field of Search ...................... 176/86 R, 86 L, 22, 176/37

[56] References Cited

U.S. PATENT DOCUMENTS

| | | | |
|---|---|---|---|
| 3,113,913 | 12/1963 | Newton | 176/37 |
| 3,222,254 | 12/1965 | Maldague et al. | 176/86 L |
| 3,365,367 | 1/1968 | Dolle | 176/37 |
| 3,378,450 | 4/1968 | Gramer et al. | 176/86 L |
| 3,380,889 | 4/1968 | Loose | 176/86 L |
| 3,480,515 | 11/1969 | Goeldner | 176/86 L |
| 3,578,562 | 5/1971 | Johnson et al. | 176/86 L |
| 3,666,626 | 5/1972 | Gramer et al. | 176/86 L |
| 3,748,864 | 7/1973 | Lofredo et al. | 176/37 |

FOREIGN PATENT DOCUMENTS 1080794  8/1967  United Kingdom ................. 176/86 L Primary Examiner—Harvey E. Behrend
Attorney, Agent, or Firm—J. R. Campbell; Z. L. Dermer

[57] ABSTRACT

Ion exchangers which reversibly store borate ions in a temperature dependent process are combined with evaporative boric acid recovery apparatus to provide a boron control system for controlling the reactivity of nuclear power plants. A plurality of ion exchangers are operated sequentially to provide varying amounts of boric acid to a nuclear reactor for load follow operations. Evaporative boric acid recovery apparatus is utilized for major changes in the boron concentration within the nuclear reactor.

11 Claims, 2 Drawing Figures

BORON CONTROL SYSTEM FOR A NUCLEAR POWER PLANT

This is a continuation of application Ser. No. 2,797, filed Jan. 14, 1970, now abandoned.

BACKGROUND OF THE INVENTION

This invention pertains to homogenous nuclear reactor control systems and more particularly to a system for varying the amount of boron in the coolant fluid for a nuclear reactor system.

The presently utilized system for changing the boric acid concentration in the coolant fluid of a nuclear reactor system generally accomplishes same by drawing off a portion of the coolant and replacing that portion with an equivalent amount of either demineralized and deaerated water, or water which has been previously blended so as to have a high concentration of boric acid.

In general, the coolant removed from the coolant system of a nuclear reactor plant is first conveyed to an evaporator which concentrates the boric acid to a fixed amount or percentage by weight of boron and stores this concentrated boric acid solution in one tank and the generally demineralized and deaerated water from the evaporator in another tank. The two storage tanks might then be used to feed either demineralized and deaerated water or to mix the highly concentrated boric acid concentrate with water so as to vary the boration of the solution fed to the nuclear reactor.

More recently, the use of anion exchange beds containing basic anion resins which operate to directly change the boric acid in the primary coolant stream, depending upon the temperature of the influent to such a bed, have been contemplated for this purpose. Such a system is shown and described in U.S. Pat. No. 3,666,626 - Gramer et al entitled "Method and Means for Reversibly Changing the Boric Acid Concentration in the Coolant of a Nuclear Reactor" assigned to the same assignee as the invention. In accordance with that invention, the enrichment or depletion of boric acid in the primary coolant water is accomplished by passing a portion of that coolant through an anion exchange resin bed charged with boric acid. The temperature of the water flowing through the bed is varied such that boric acid enters the coolant at relatively higher temperatures and is taken from the coolant and stored in the resin bed at relatively lower temperatures.

Each of the above systems has inherent advantages and disadvantages. For example, the evaporative recycle system is capable of concentrating a great amount of boric acid and storing same. However, if it must perform this function rapidly, the evaporator and associated equipment becomes exceedingly large and expensive. On the other hand, the ion exchangers can perform the function of rapidly varying the quantity of borate ions in the primary coolant of the reactor system. However, the storage capacity of the ion exchangers is rather limited unless the ion exchange tanks are made exceedingly large or numerous and such a large quantity of resin is used so as to make the system prohibitively expensive.

Further, ion exchange beds of the prior art have been contemplated for use simultaneously while either connected in series or in parallel. Thus all of the ion exchangers would handle an equal portion of the total required concentration change. It is now known that the storage capacity of a resin bed is lower for lower concentrations of borate ions in the flow passing therethrough. Accordingly, the simultaneous use of a plurality of ion exchangers necessitates an amount of resin in excess of that which might be used when the variation in storage capacity with concentration is taken into account.

SUMMARY OF THE INVENTION

The aforementioned disadvantages of the described prior art systems can be minimized by utilizing ion exchange beds for load follow purposes and a reduced size evaporator for reduction in boron concentration with core life and other purposes. The size of the ion exchange beds can be further reduced by operating them sequentially.

In contrast with the prior art, the ion exchange beds are used primarily for load follow purposes. This would mean a utilization of the beds for concentration changes in the primary coolant of about 100 parts per million which would correspond to a 50% load follow capability. The coolant, which is drawn from the primary system, is first conveyed to a single ion exchange bed; this bed may be used for example to store boric acid from the flow and to consequently lower the boric acid concentration in the primary coolant. The single ion exchanger to which the flow is directed is used until a boric acid metering device indicates an increasing readout on the boric acid concentration thus indicating that the first ion exchanger has been saturated. The flow is then directed to a second ion exchange bed until the same phenomenon indicating saturation takes place and then to a third bed and so on. This sequential utilization of the ion exchange beds produces a more efficient utilization of the resin and the amount of resin can be decreased accordingly.

The evaporative recycle system handles the effluent produced only during reactor operations other than load follow. Thus the amount of effluent which must be stored and processed can be greatly reduced. An evaporator has the capability of concentrating the boric acid in the flow diverted from the primary coolant system to a high degree. If it is only necessary to concentrate boric acid over a long period of time an extremely small evaporator can be used. In accordance with this invention for example, after fuel reloading and the operation, the evaporator would be used to remove that boric acid from the system which is no longer necessary to compensate for the fresh fuel reloading. That is, as an amount of fuel is burned in the reactor, a proportional amount of boric acid concentrate can be removed from the system. In certain systems the time period over which this removal can take place approximates one year. On the other hand, if ion exchangers were used to store the boric acid at the concentration level at which it was removed from the reactor as well as for those other purposes in which boron concentrations are employed, a substantially larger number of ion exchange beds would be necessary.

Accordingly, a combination of the above systems produces a highly efficient operation wherein each system is used for the function it most suitably performs. The particular combination of ion exchangers and evaporators to be used on a plant depends upon equipment cost and required operation sequences.

DESCRIPTION OF THE DRAWING

For a better understanding of the invention reference may be had to the accompanying drawings depicting an exemplary embodiment of the invention in which.

DESCRIPTION OF A PREFERRED EMBODIMENT

Figure 1:
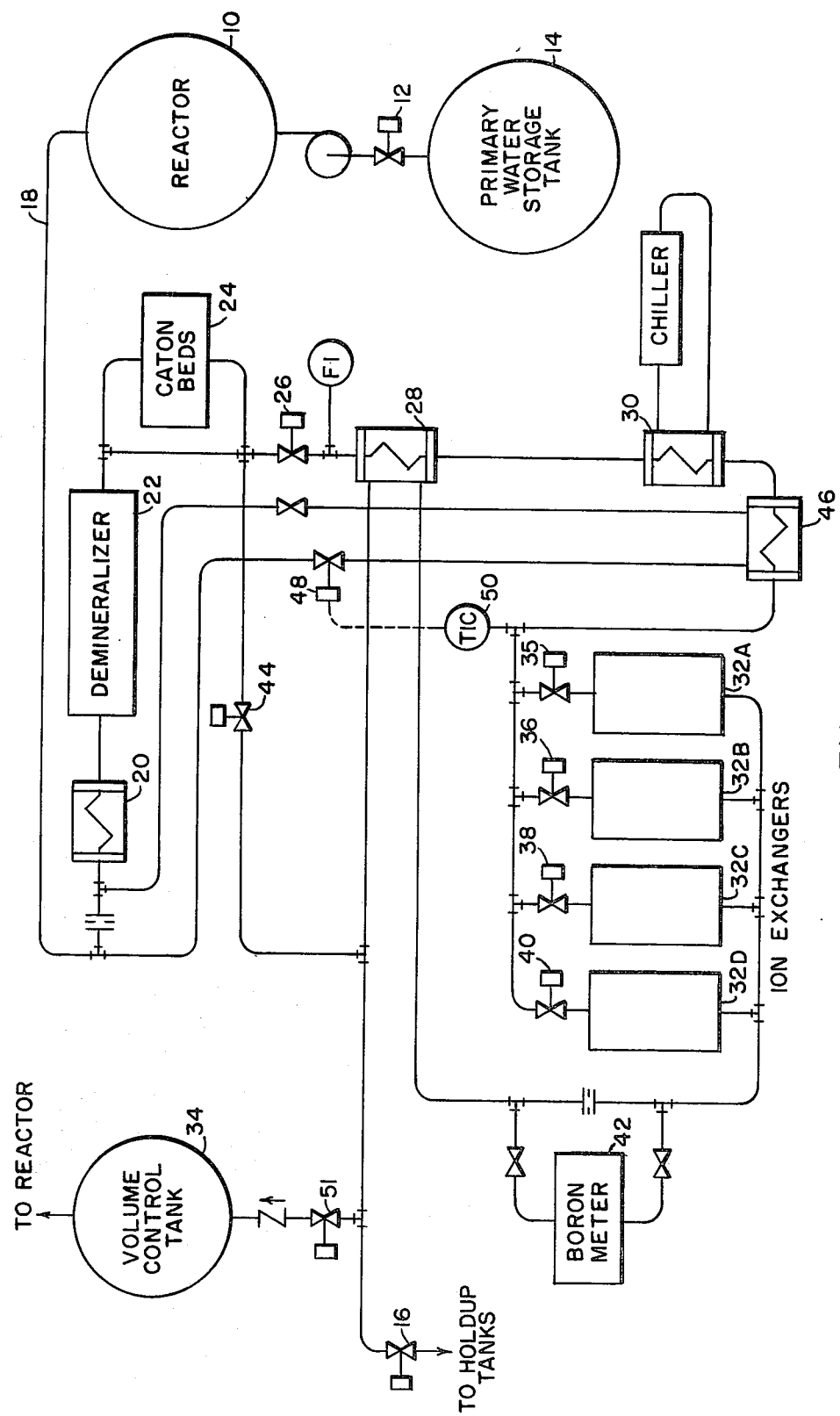
FIG. 1 shows a schematic representation of the ion exchanger bed flow schematic and FIG. 2 shows a schematic representation of the evaporative recycle system flow schematic and its cooperative relationship with the ion exchange system.

Referring to FIG. 1, there is shown a nuclear reactor 10 which includes one or more closed loop coolant circulating systems as is well known in the art. A connecting conduit 18 draws off predetermined amount of coolant, in this example light water, from the primary circulation system for chemical control purposes, such as during plant startup, load follow operations, shutdowns and/or boron removal. Briefly, if dilution of the coolant within the reactor is desired, makeup water is sent to the reactor coolant by opening a valve 12 to allow demineralized and deaerated water from the primary water storage tank 14 to enter the primary cooling system of the nuclear reactor 10. A preselected quantity of concentrated boric acid solution at a predetermined flow rate is added to the reactor coolant system.

The apparatus shown in FIG. 1 is essentially the same as that shown and described in detail in the aforementioned copending application of Gramer et al although the mode of operation has been changed in accordance with this invention.

Where dilution of boron ion concentration in the water within the reactor is desired, valves 12 and 16 are first closed. A predetermined amount of flow is permitted to leave the reactor via conduit 18. This flow may be referred to as the letdown flow and passes through a letdown heat exchanger 20, a mixed bed demineralizer 22, and intermittently through cation beds 24; and is there purified in the normal manner. The water then flows via valve 26 and moderating heat exchanger 28 to a letdown chiller heat exchanger 30 where the water is cooled to, for example, 50° F. The water which enters the ion exchangers 32 at this low temperature loses its content of boric acid which is stored on the ion exchangers. Ion exchangers 32 contain a temperature sensitive resin such as a styrene di-vinyl benzene polymer which absorb borate ions from the coolant and whose absorption capacity increases as the resin temperature decreases. Water with a very low concentration of boric acid leaves the ion exchangers and is sent via the moderating heat exchanger 28 back to a volume control tank 34 from which the usual charging system returns the water to the reactor 10. The control of this system is such that only one ion exchanger 32 is utilized at a given time. At the start of the dilution valves 36, 38 and 40 are closed. The boric acid concentration of the flow which passes through ion exchanger 32A via valve 35 is continuously read on a boron meter 42 of known construction. An increase of the extract concentration of ion exchanger 32A indicates that the resins within the exchanger 32A are saturated with boron. At that moment, the valve 35 is closed and the valve 36 is opened so that ion exchanger 32B is used for the next portion of boron storage. This process can be repeated until all the ion exchangers 32 are saturated. If desired, a throttle valve 44 may be closed and the entire letdown flow would pass through valve 26 and the maximum rate of dilution would be achieved. At the beginning of core life, the boric acid concentration of the primary coolant must be high. Thus, the required amount of dilution water for a given change in concentration is smaller near the beginning of core life than near the end of core life when the boron concentration within the reactor coolant is lower. Therefore, the maximum letdown flow for boron removal or coolant dilution purposes is only required near the end of core life. For this reason, throttle valve 44 is used to control the amount of flow which passes through the ion exchangers 32. A part of the letdown flow is then returned to the volume control tank without losing its boric acid content which means that the rate of dilution may be controlled by controlling the throttle valve 44.

The amount of resin necessary in the ion exchange beds 32 depends upon the storage capacity of the resin, the volume of the primary system and the required change in concentration of the primary water. For given operating temperatures of the resin and a given size reactor, the storage capacity of the resin and the volume of the primary coolant are fixed quantities, the amount of resin is then only dependent upon the required change in concentration. The system described in this invention desirably is sized to store an amount of boron which corresponds to a change in concentration of the primary coolant required for load follow purposes. As will be explained, an evaporator recycle system may be utilized where greater changes are desired.

When a higher concentrate of boric acid is desired to be added to the reactor, valves 12 and 16 are first closed. The letdown flow then follows the same path as in the case of dilution; explained in detail above. The water which enters the system via valve 26 is not cooled in the letdown heat exchanger 30 but is rather increased in temperature in a letdown reheat heat exchanger 46 to a temperature which is limited to the maximum allowable temperatures at which the resin can be used. The temperature of the flow which enters the ion exchangers 32 is controlled by controlling a throttle valve 48 such that hot water of about 300° F. can pass through the shell side of the letdown reheat heat exchanger 46 and heat up the effluent, for example to 170° F. A temperature indicating control 50 located downstream of the letdown reheat heat exchangers 46 controls valve 48 in throttling of the heating fluid to maintain the desired temperature of the heated influent to the ion exchangers 32. The water flowing through each ion exchanger 32 now takes up boron from the resin. The extraction of boron continues until the resin in the ion exchanger tanks 32 reaches a new equilibrium point at which no more boron is being removed. The boron meter 42 gives a continuous reading of the boric acid concentration of the flow which passes from each ion exchanger 32. A decrease in the extract concentration indicates that the resin is depleted and the letdown flow is then fed sequentially through the next resin bed 32B, 32C and 32D, etc. The boron enriched water which leaves the ion exchangers 32 is sent back to the primary coolant system via moderating heat exchanger 28 and volume control tank 34.

As previously indicated, a major cost savings results from reducing the amount of effluent that must be reprocessed. As explained above, the effluent produced during load follow operations can be greatly reduced by the use of boron storage resin ion exchange system described. Another source of effluent requiring reprocessing in the prior art was that resulting from a removal of boron from the system, as for example, with the reduction in fissionable material caused by fuel burnup.

In accordance with the present invention, in order to remove boron from the system, valve 44 is closed and the process operates initially as described under the dilution mode, the letdown flow is chilled in heat exchanger 30 and boron is removed therefrom in the ion exchangers 32A, 32B, 32C and 32D. After the resin beds 32A, 32B, 32C and 32D are sequentially saturated with boron, a valve 51 controlling the entry of fluid to volume control tank 34 is closed and valves 12 and 16 are opened. The system then operates as described above under the boron addition mode except that the effluent is sent to holdup tanks (not shown) in FIG. 1 and the water is pumped from the primary water storage tank 14 into the primary coolant system. After depletion of the resin of the boron from the resin beds 32, valves 16 and 12 are again closed and valve 51 is reopened. This process may be repeated until the required decrease in boric acid concentration in the primary coolant is achieved.

Figure 2:
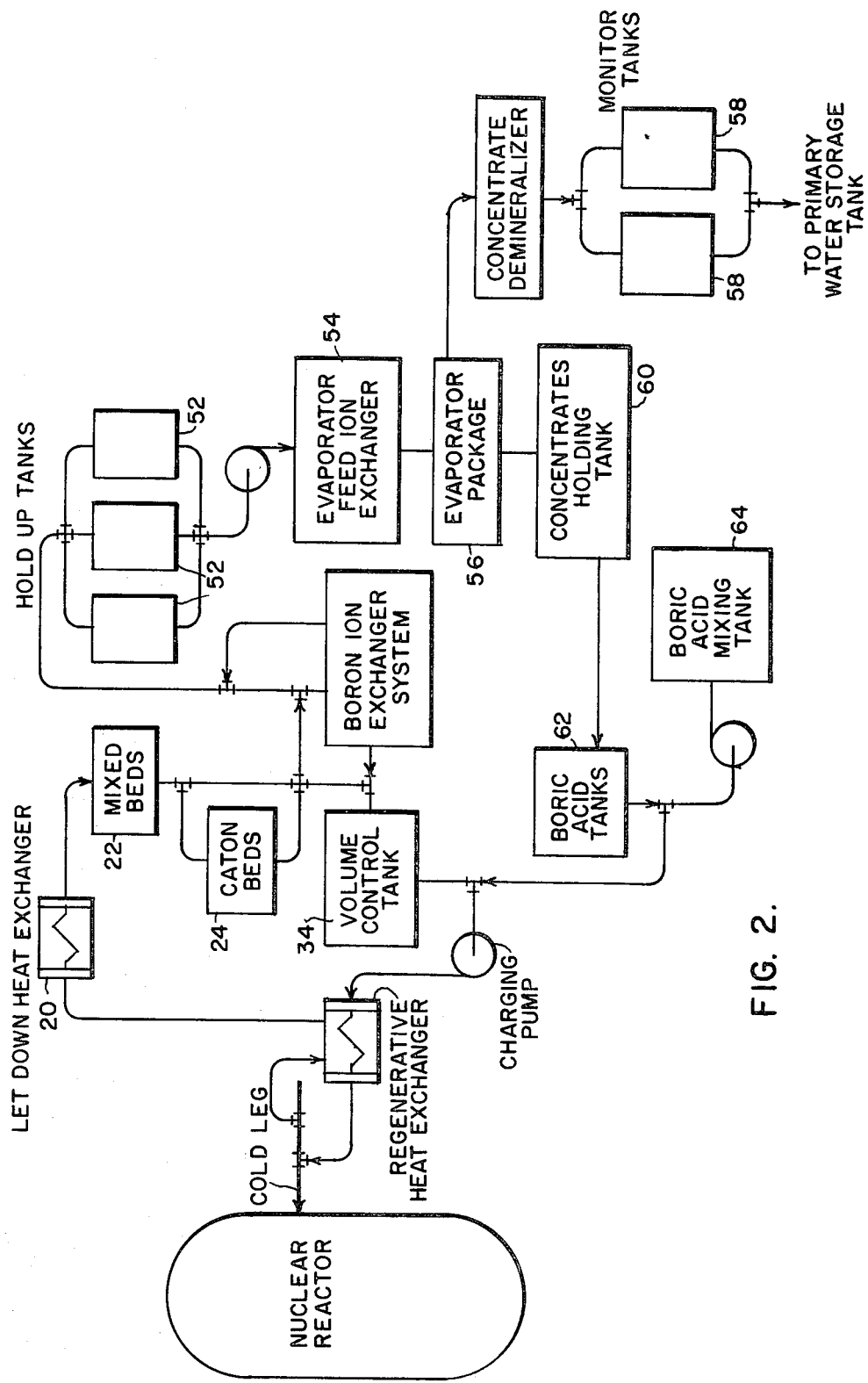

The effluent which is sent to the holdup tanks 52 (see FIG. 2) initially causes a displacement of the cover gas therein. Initially the tanks are filled with nitrogen which is displaced by the entering fluid and is pumped by compressors to gas decay tanks (not shown). The fluid in the holdup tanks 52 is pumped to evaporator feed ion exchanger 54 where nitrogen, hydrogen and fission gases are removed therefrom. The fluid is then pumped to the boric acid evaporator package 56 where the evaporative process separates the boric acid from the primary water. This is a continuous batch operation which produces a high concentration of boric acid solution. Although one gas stripper 54 and one evaporator package 56 are shown connected in series, two gas stripper units and two evaporators are more often used, operating in parallel. Distillate from the evaporator flows continuously to monitor tanks 58 where samples are drawn and evaluated before the fluid is pumped to the primary water storage tank 14. The evaporator bottom collects boric acid solution which gradually increases in concentration during the process. The accumulated batch is then sent to concentrate holding tanks 60 where samples are also drawn to check the boric acid concentration. Following this, the fluid is pumped to boric acid tanks 62. In the case of boration, the flow of boric acid from the boric acid tanks 62 and water from the primary water storage tank 14 are sent to a boric acid mixing tank 64 where the primary coolant is blended to the proper concentration and then fed directly into the primary coolant.

It should now be apparent that a combination of an ion exchange system which is utilized for normal load follow operations and an evaporative process which is utilized to remove boron for the system allows for substantial reduction in the size and cost of systems required for a boron chemical shim recycle system. By way of a general numerical example of the reductions possible with this system, in the presently sized nuclear reactor plants, a daily load reduction of 50% would produce about 50 system volumes of effluent per core life. An additional 10 system volumes per core life are produced during other operations such as plant startup, shutdown and compensation for core burnup reactivity effects.

In the prior art, the 60 system volumes would have to be processed by a plurality of large evaporators. As can be seen with the process of this invention, a small evaporator can handle the entire boron reduction inasmuch as the normal load follow functions can be performed by the ion exchange system. It should further now be apparent that a sequential operation of the ion exchangers allow for a reduction in the size of this system and an increase in the efficiency of same.

We claim as our invention:

1. A nuclear reactor control system comprising:
    a nuclear reactor having a coolant containing a neutron absorber circulating therethrough,
    at least one ion exchanger flow-coupled with said nuclear reactor; said ion exchanger having basic anion exchange resins therein capable of chemically storing a material having the property of capturing neutrons, said ion exchange resins being temperature dependent with respect to their storage capacity of neutron capturing material;
    at least one heat exchanger flow-coupled to the ion exchanger and the reactor for varying the temperature of the coolant influent to said ion exchanger;
    means selectively connecting the outlet of said ion exchanger with said reactor for supplying coolant effluent therefrom to the reactor to accommodate reactor load follow operations; and
    at least one evaporator capable of concentrating a solution of said neutron capturing material flow-coupled to the ion exchanger for selectively receiving the coolant effluent from said ion exchanger,
    means connecting said evaporator with a high concentration tank and a low concentration tank to thereby provide separate solutions having a high concentration of neutron capturing material and a low concentration of neutron capturing material; and
    means separately connected to said high and low concentration tanks for separately supplying the effluent therefrom to said reactor to accommodate major changes in reactor load.

2. The reactor control system of claim 1 including a plurality of said ion exchangers,
    means for determining the concentration of neutron capturing material in the effluent of said ion exchangers; and
    means responsive to said determining means for selectively and sequentially flow-coupling each of the ion-exchangers to the nuclear reactor.

3. A process for controlling the amount of neutron-capturing material in reactor coolant, which comprises:
    diverting a predetermined quantity of fluid containing a neutron-capturing material from the primary cooling system of a nuclear reactor;
    selectively heating or cooling said fluid quantity dependent upon whether the amount of homogeneously dispersed neutron-capturing material within the reactor is to be, respectively, increased or decreased;
    conveying said fluid quantity through an ion exchanger having a temperature dependent absorption capacity for the neutron-capturing material to either remove or release neutron-capturing material;
    periodically returning at least portions of said fluid quantity from the ion exchanger to said reactor cooling system for load follow purposes;
    periodically conveying at least a portion of said fluid quantity from the ion exchanger to evaporating means to provide separate solutions of neutron-capturing material of high and low concentrations; and selectively supplying each of said solutions to said reactor to accommodate major changes in reactor load.

4. A process for controlling the amount of neutron-capturing material in reactor coolant, which comprises;

diverting a predetermined quantity of fluid containing a neutron-capturing material from the primary cooling system of a nuclear reactor;

selectively heating or cooling said fluid quantity of fluid dependent upon whether the amount of homogeneously dispersed neutron-capturing material within the reactor is to be, respectively, increased or decreased;

conveying said fluid quantity through an ion exchanger having a temperature dependent absorption capacity for neutron-capturing material to either remove or release neutron-capturing material;

testing the effluent from said ion exchanger to determine the amount of neutron-capturing material in solution; and periodically and sequentially diverting the fluid to other ion exchangers, each diversion being indicated by the step of testing;

returning a portion of the effluent from said ion exchangers to said cooling system to accommodate reactor load follow operations;

periodically conveying at least a portion of said effluent from said ion exchangers to evaporating means to provide separate solutions of neutron-capturing material of high and low concentrations; and selectively supplying each of said solutions to said reactor to accommodate major changes in reactor load.

5. A nuclear reactor control system comprising:

a nuclear reactor having a primary coolant system containing a coolant having a neutron absorber therein;

means for varying the quantity of neutron absorber in said coolant;

said means comprising multiple parallel connected ion exchangers having basic an ion exchange resins therein capable of chemically storing a material having the property of capturing neutrons, said ion exchanger resins being temperature dependent with respect to their storage capacity of neutron capturing material;

heat exchange means flow-coupled with said reactor coolant system and said ion exchanger for varying the temperature of a portion of coolant withdrawn from the reactor prior to supplying it to said ion exchangers, said coolant selectively being heated or cooled depending on whether the amount of neutron absorber in the coolant is to be increased or decreased;

a volume control tank and liquid evaporator means connected to the outlet of said ion exchangers to receive the effluent therefrom, separate valve means between said ion exchangers outlet and the volume control tank and between the ion exchangers outlet and said evaporator means, said valve means being selectively operable to discharge the effluent from the ion exchangers into said volume control tank for return to the reactor coolant system or into said evaporator means depending on the amount of neutron absorber to remain in said coolant;

a primary water storage tank connected through valve means directly with said reactor coolant system for selectively furnishing water thereto as coolant is withdrawn from the system; and means connecting the discharge side of said evaporator means with the primary water storage tank;

whereby upon closing the valve means to said evaporator means and to said primary water storage tank, the portion of coolant from the reactor coolant system is circulated through said ion exchangers to effect slight changes in neutron absorber in said coolant, and to effect large changes in the neutron absorber in said coolant, the valve means to the primary water storage tank is opened and to the volume control tank closed, and the valve means to said evaporator means opened, thereby permitting circulation of reactor coolant through said ion exchangers and evaporator means for changing the neutron absorber content therein while simultaneously supplying water from the primary storage tank to the coolant system to replace the amount of coolant withdrawn therefrom.

6. The system according to claim 5 wherein coolant flow control means is located between the ion exchangers and the volume control tank for controlling the amount of coolant flowing through said ion exchangers thereby to control the rate of dilution of neutron absorber in said coolant.

7. The system according to claim 5 wherein test means connected in the outlet of said ion exchangers determines the amount of neutron absorber in the ion exchanger effluent; and means in the inlet to each of said ion exchangers responsive to said test means for selectively and sequentially diverting said coolant from one ion exchanger to another when the resins in said one ion exchanger have absorbed a maximum amount of neutron absorber or when the neutron absorber on said resins have been completely depleted.

8. The system according to claim 5 wherein said heat exchanger means includes a let down chiller heat exchanger serially connected with a let down reheat heat exchanger.

9. The system according to claim 5 wherein said evaporator means includes hold up tanks for receiving effluent from said ion exchangers; and means connecting said hold up tanks with an evaporator tank which separates the neutron absorber from the coolant prior to returning the coolant effluent to the primary water storage tank; and means connecting the evaporator tank with a concentrate holding tank which serves as storage for the separated neutron absorber.

10. The system according to claim 9 wherein effluent from the hold up tanks is supplied to an evaporator feed ion exchanger which removes gas from the coolant prior to discharge into said evaporator tank.

11. The system according to claim 9 wherein the concentrate holding tank is connected with a neutron absorber mixing tank for supplying concentrated neutron absorber thereto, means connecting said primary water storage tank with said mixing tank wherein coolant from the storage tank is mixed with the neutron absorber concentrate; and means connecting said mixing tank with the reactor coolant system for supplying the neutron absorber-water mixture thereto for reactor control purposes.

* * * * *